April 1, 1930.  F. AESCHBACH  1,752,628
MIXING AND KNEADING MACHINE
Filed July 15, 1929   4 Sheets-Sheet 1
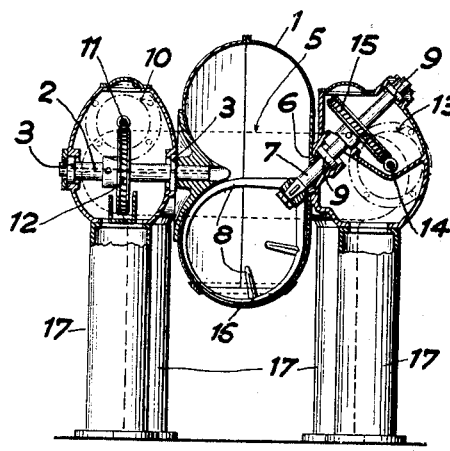
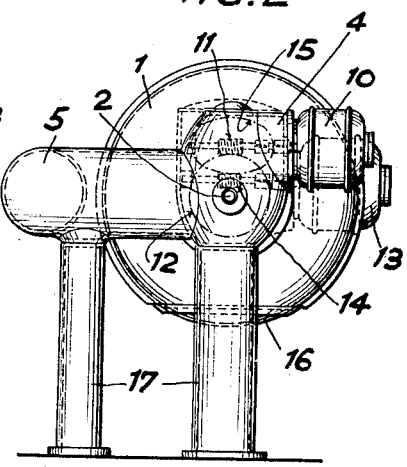
INVENTOR:
Friedrich Aeschbach
By Henry Ortt
atty

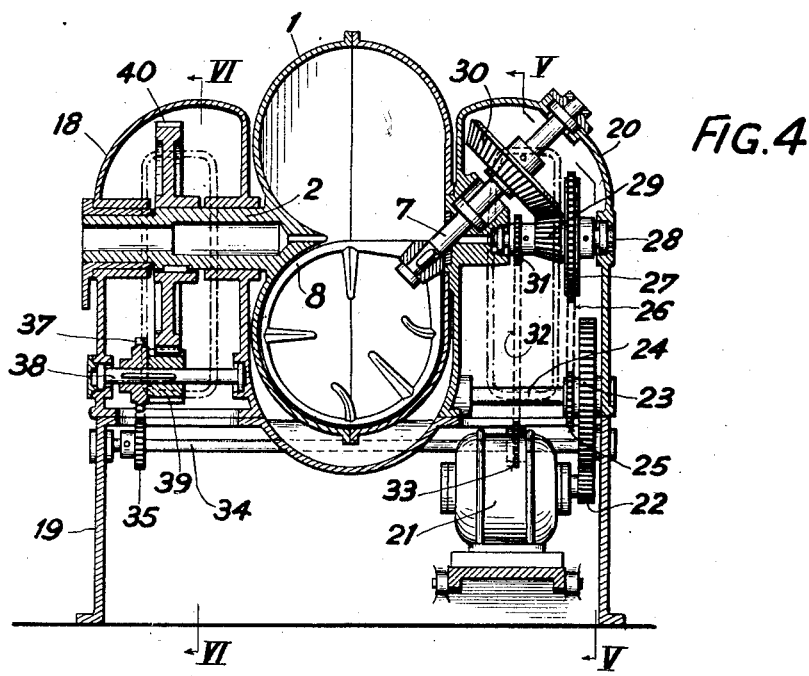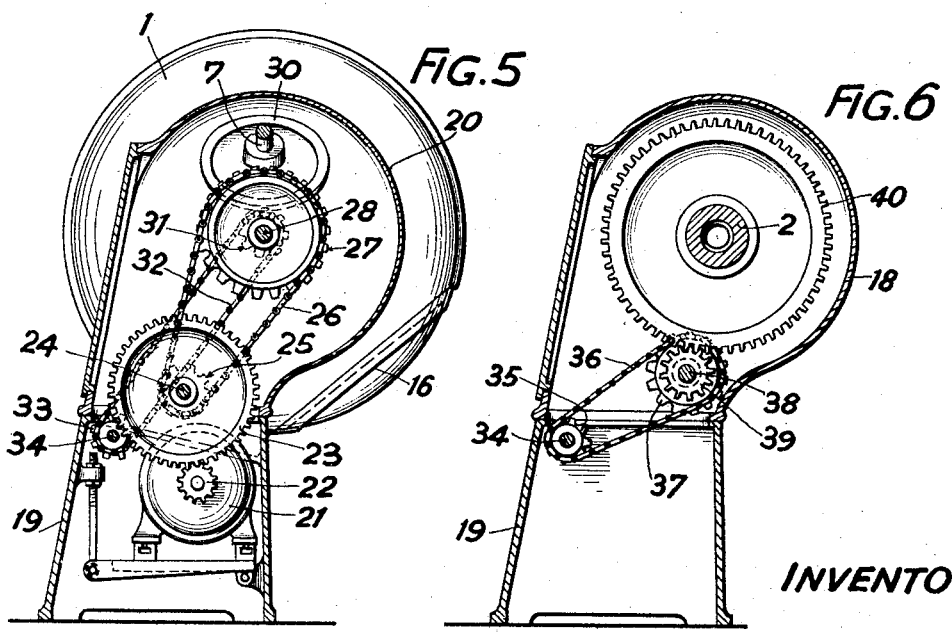

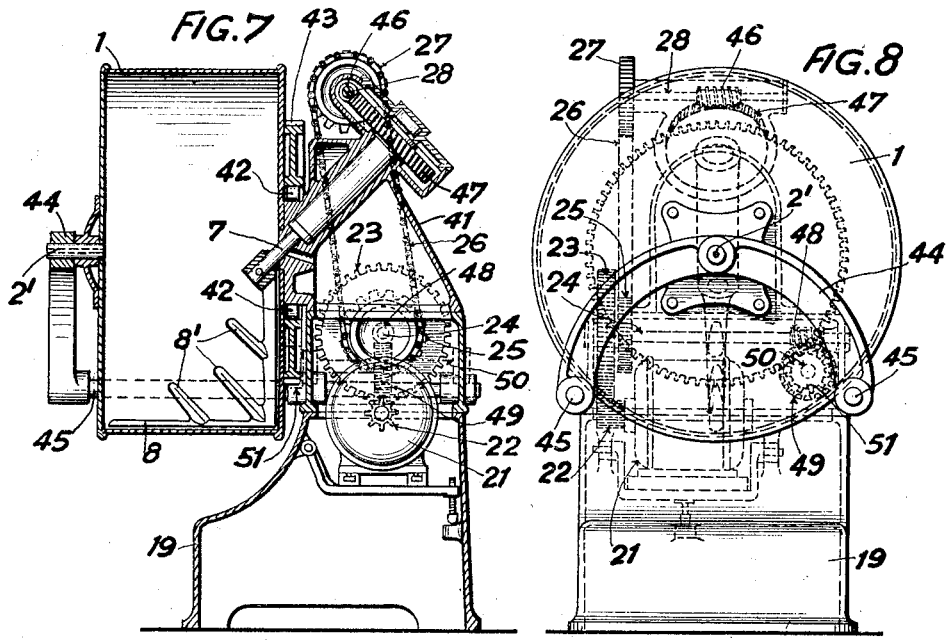
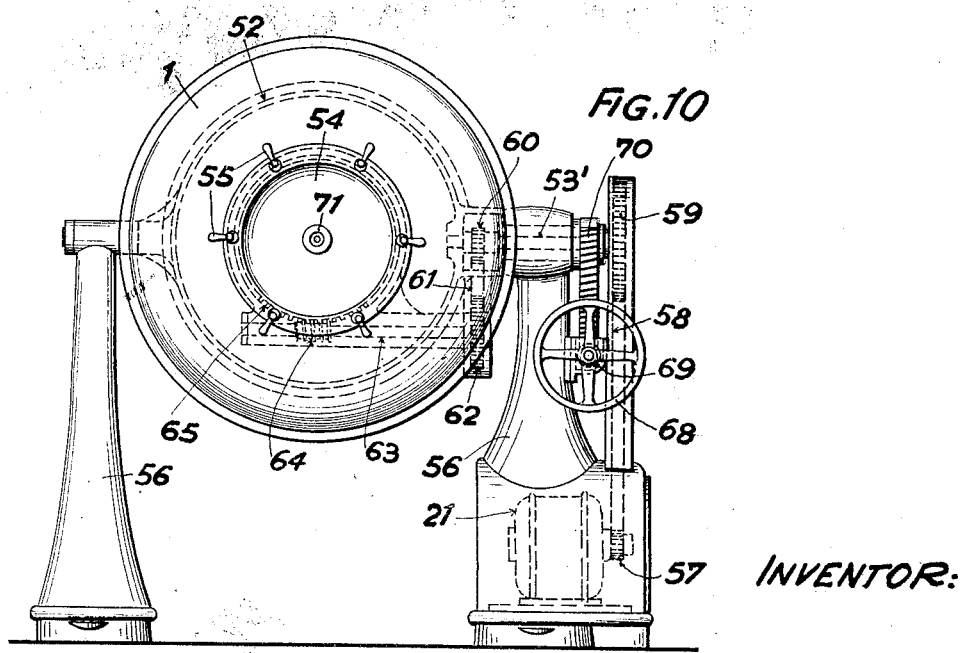

April 1, 1930.  F. AESCHBACH  1,752,628
MIXING AND KNEADING MACHINE
Filed July 15, 1929  4 Sheets-Sheet 4

INVENTOR:
Friedrich Aeschbach
By Henry Orth
Atty.

Patented Apr. 1, 1930

1,752,628

UNITED STATES PATENT OFFICE

FRIEDRICH AESCHBACH, OF AARAU, SWITZERLAND

MIXING AND KNEADING MACHINE

Application filed July 15, 1929, Serial No. 378,490, and in Switzerland June 13, 1929.

The present invention has reference to a mixing and kneading machine particularly for treating doughy substances.

The hitherto known dough mixing and kneading machines are provided with a trough turnable about a vertical axis and with which mixing blades or kneading arms cooperate, the latter performing various movements in the different types of such machines.

The mixing effect obtained with the known machines is not a maximum as during the turning of the trough the dough moves out of contact with the kneading arms and is only again brought into contact with said arms after a certain turning movement of the trough.

This disadvantage shall be obviated by the mixing and kneading machine forming the subject matter of the present invention. According to the invention this machine is provided with a receptacle or drum turnable about a horizontal axis and adapted to receive the substances to be treated, and with a mixing and kneading implement, the inclined axis of which projects into the drum through a central opening in the wall of the drum.

Preferably the axis of the implement is inclined in the downward direction at an angle of 45° so that the implement is situated on the lowermost part of the drum in which the substances collect and means are provided for driving the axle of the implement. These means may cause besides the rotation of the implement a circular movement of the latter about the axis of the drum.

It is of particular advantage to arrange the drum to be hermetically closable and to tighten the axle of the mixing implement where it enters the drum so that the drum can be worked with pressure or underpressure.

The turning axle of the drum is preferably provided with a longitudinal bore to connect it up to a source of pressure or underpressure or for introducing a liquid or a gas during the mixing. Thus when the mixing machine is used in the chemical industries a chemical reaction may, for instance, be combined with the mixing process.

Constructional examples of the subject matter of the present invention are illustrated on the accompanying drawings, in which:

Figs. 1–3 show in a vertical section, in an end elevation and in a plan view respectively a first constructional example, Fig. 4 is a vertical section of a second constructional example, Fig. 5 is a section along line V—V in Fig. 4, Fig. 6 is a section along line VI—VI in Fig. 4.

Figs. 7 and 8 show in a vertical section and in a side view respectively a third constructional example, and Figs. 9–11 show in elevation, end elevation and in a horizontal section respectively a fourth constructional example of the machine.

Figure 9:
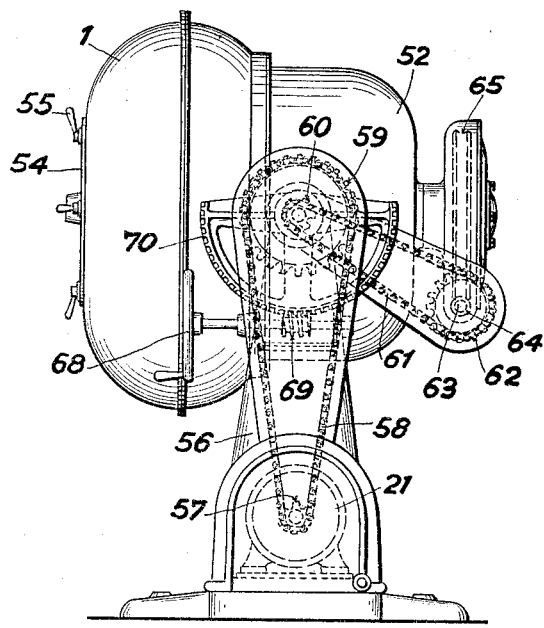

In the constructional example illustrated in Figs. 1–3 1 denotes the receptacle or drum turnable about a horizontal axis. To this end the drum 1 is fixed to a shaft 2, mounted by ball bearings 3 in one shank of stirrup-shaped frame 5, and provided with a longitudinal bore. The shaft 2 does not pass through the drum 1 and the latter is centrally guided at 6 in the other shank 4' of the frame 5 and is packed at this point, for instance by a packing not shown. A mixing and kneading blade 8 is fixed to an axis 7 inclined in the downward direction at an angle of 45° and projecting through one wall of the drum into the latter; the blade 8 takes up nearly the whole cross-section of one half of the drum cross-section. The axle 7 of the stirring blade is mounted in the shank 4' of the frame by means of ball bearings 9.

To the drum 1 a turning motion about its horizontal axle is imparted by a motor 10 fixed to the shank 4 of the frame and driving a worm 11, which cooperates with a worm wheel 12 fixed to the axle 2. The turning movement of the blade 8 is effected by means of a motor 13, fixed to the shank 4' of the frame, a worm 14 and a worm wheel 15. The separate drive of drum and stirrer permits the actuation separately of only one or the other of these two elements or both. The arrangement of the axle of the blade 8 is such that the latter is at the lowermost part of the drum in which the substances collect when during the rotation of the drum around the horizontal axis they are carried round to some extent and drop off the parts of the wall moving in the upward direction. The drum 1 is provided with a hermetically closing cover 16 serving for charging or emptying the drum; through the bore of the axle 2 gas under pressure may be supplied or a liquid or a connection to a suction conduit may be made. As the stirrup-shaped frame 5 is carried on columns 17 and encircles the drum only from one side whilst the other side is free portable receptacles for the dough may be run from the motor end below the drum in order to facilitate the emptying.

In the constructional example illustrated in Figs. 4 to 6 the frame for mounting the horizontal axle 2 of the drum 1 comprises a casing 18 formed as a hollow body and supported on a chest-like lower part 19. A similar casing 20 is provided for mounting the axle 7 of the mixing blade 8 and the drum is centrally guided in and tightened against the casing 20. The shape of the casings 18 and 20 is such that the drum 1 projects on one side beyond the lower part 19. This arrangement has for its purpose to facilitate the emptying of the drum, which, as in the above example, is carried out by means of a cover 16, a portable receptacle may be run up to the lower part 19 and the drum empties into it when the opening is in the position shown in Fig. 5 and the cover is removed.

With this constructional example the drum 1 and the mixing blade 8 are driven by the same motor 21. The pinion 22 on the motor shaft cooperates with a gear wheel 23 on a shaft 24, to which a chain wheel 25 is fixed. A chain 26 connects the chain wheel 25 with a chain wheel 27 on a shaft 28 mounted in the casing 20 and carrying a bevel wheel 29 which cooperates with a bevel wheel 30 on the axle 7 of the mixing blade. Further to the shaft 28 a chain wheel 31 is fixed which drives a chain wheel 33 by means of a chain 32 the chain wheel 33 being fixed to a shaft 34 mounted in the lower part 19 of the frame of the machine and having a further chain wheel 35 fixed to it. From the latter a chain 36 leads to a chain wheel 37 on a shaft 38 to which a gear wheel 39 is keyed, which cooperates with a gear wheel 40 fixed to the shaft 2 of the drum 1.

The constructional example illustrated in Figs. 7 and 8 differs from that described above firstly by the shape of the drum which is cylindrical. In accordance with the cylindrical shape of the drum 1 the mixing implement 8 is formed as a rectangular arm having branches 8'. The frame of the machine comprises again a chest-like lower part 19 on which a standard formed as a hollow body is fixed. In the latter the axle 7 of the mixing blade 8 is mounted inclined in the downward direction at an angle of 45°. The drum 1 projects beyond the standard and is rotatably mounted in the latter by means of a roller bearing 42, which cooperates with the boss of a gear wheel 43 fixed to one side of the drum. On the other side of the drum an axle 2' having a longitudinal bore is mounted in a traverse 44 carried by two rods 45 cantilevered from the frame.

The drive of drum and mixing arm is effected by a motor 21 common to both and by the intermediary of a spur gearing 22, 23 and a shaft 24 from which a worm 46 is driven by means of a chain wheel 25, chain 26 and chain wheel 27; the worm 46 meshes with a worm wheel 47 fixed to the axle 7 of the mixing arm 8. On the shaft 24 a worm 48 is fixed, which meshes with a worm wheel 49 on a shaft 50, on which a spur gear wheel 51 is provided, which meshes with the gear wheel 43 fixed to the drum 1.

Figure 11:
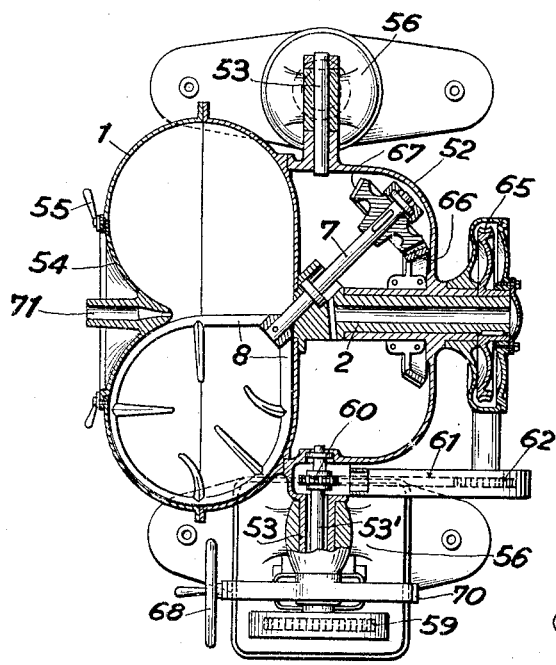

With the constructional example illustrated in Figs. 9–11 the axle 2 of the drum 1 is mounted in the frame part 52. The latter is tiltable about an axis formed by two gudgeons 53 and arranged at right angles to the axle 2 of the drum; the tilting of the drum about the axis 53 serves for emptying the drum. In this case a central cover 54 for charging and emptying the drum 1 is provided which may be connected with the drum in an air-tight manner by means of screws 55. The gudgeons 53 are mounted in two standards 56. The axle 7 of the mixing blade 8 is inclined at an angle of 45° towards the horizontal turning axle 2 of the drum 1.

The drive of drum and mixing blade is effected by a motor 22 common to both by the intermediary of a chain wheel 57, chain 58, chain wheel 59, shaft 53', chain wheel 60, chain 61, chain wheel 62, shaft 63, worm 64 and worm wheel 65 fixed to the axle 2. On the frame part 52 a bevel wheel 66 is fixed on which a bevel wheel 67 fixed on the axle 7 of the mixing blade 8 rolls when the drum turns around its axis 2. In this case the mixing blade 8, besides turning about its own axle 7 carries out a turning movement about the horizontal axis of the drum 1.

In order to tilt the drum a hand-wheel 68 is mounted in the standard 56 and serves to actuate a worm 69 cooperating with a worm wheel segment 70. The latter is fixed to the hollow gudgeon 53 forming the extension of the frame part 52, the hollow gudgeon 53 and the gudgeon 53 in the other frame part forming together the tilting axis of the drum 1. The fact that the shaft 53' of the drives of the drum and mixing blade and the gudgeon 53 are coaxially arranged ensures that the drive is not hindered by the tilting movement and may continue to operate during the tilting. It is therefore not necessary to remove neither the drum nor the mixing blades, during the tilting as is the case with known types of mixing and kneading machines.

The cover is provided with bore 71 to permit a connection for producing pressure or under-pressure in the drum or to introduce a gas adapted to act during the mixing.

The turning motion of the drum about a horizontal axis and of the mixing blade about an axis inclined to the axis of the drum ensures a very good mixing effect, as the mixing blade is in the lowermost part of the drum in which the substances to be treated collect. In order to empty the drum it is not necessary to first remove the drum or the mixing blade out of their operative positions, (neither is it the case with the tiltable type), the emptying can therefore be carried out quickly. During the emptying mould and mixing blade may continue their movements. The machine is distinguished by its simple design and is cheap in manufacture.

I claim:

1. A mixing and kneading machine, particularly for treating doughy substances, in combination, a receptacle for receiving the substances to be treated and turnably mounted about a horizontal axis, and a mixing and kneading implement arranged at an inclined axis and projecting into the receptacle through a central opening in a wall of the latter.

2. A mixing and kneading machine, particularly for treating doughy substances, in combination, a receptacle for receiving the substances to be treated and turnably mounted about a horizontal axis, and a mixing and kneading implement mounted on an axle inclined at an angle of 45° in the downward direction and projecting into the receptacle through a central opening in a wall of the latter.

3. A mixing and kneading machine, particularly for treating doughy substances, in combination, a drum for receiving the substances to be treated and turnably mounted about a horizontal axis, a mixing and kneading implement, and an axle to which said implement is fixed, said axle being rotatably mounted at an inclination of 45° in the downward direction and passing into the mould through a central opening in the wall of the latter.

4. A mixing and kneading machine, particularly for treating doughy substances, in combination, a hermetically closable drum for receiving the substances to be treated having a central opening, a horizontal axle to which said drum is fixed, a frame in which said horizontal axle is turnably mounted, a mixing and kneading implement, an axle to which said implement is fixed, said axle being rotatably mounted in said frame at an inclination of 45° in the downward direction and passing through said central opening in the drum, and means to close said opening air-tight.

5. A mixing and kneading machine, particularly for treating doughy substances, in combination, a drum for receiving the substances to be treated and turnably mounted about a horizontal axis, a mixing and kneading implement, an axle to which said implement is fixed, said axle being rotatably mounted at an inclination of 45° in the downward direction and passing into the mould through a central opening in the wall of the latter, means for rotating said drum, and means for rotating said implement.

6. A mixing and kneading machine, particularly for treating doughy substances, in combination, a drum for receiving the substances to be treated and turnably mounted about a horizontal axis, a mixing and kneading implement, an axle to which said implement is fixed, said axle being rotatably mounted at an inclination of 45° in the downward direction and passing into the mould through a central opening in the wall of the latter, means for rotating said drum, and means independent of said first mentioned means for rotating said implement.

7. A mixing and kneading machine, particularly for treating doughy substances, in combination, a hermetically closable drum for receiving the substances to be treated having a central opening, a horizontal axle to which said drum is fixed, said axle having an axial bore to permit said drum to be connected to a supply of pressure or under-pressure, a frame in which said horizontal axle is turnably mounted, a mixing and kneading implement, an axle to which said implement is fixed, said axle being rotatably mounted in said frame at an inclination of 45° in the downward direction and passing through said central opening in the drum, and means to close said opening air-tight.

8. A mixing and kneading machine, particularly for treating doughy substances, in combination, a drum for receiving the substances to be treated and turnably mounted about a horizontal axis, a mixing and kneading implement, an axle to which said implement is fixed, said axle being rotatably mounted at an inclination of 45° in the downward direction and passing into the mould through a central opening in the wall of the latter, means for rotating said drum, and means for causing a rotation of said implement about its own axis and a turning movement about the horizontal axle of the drum.

9. A mixing and kneading machine, particularly for treating doughy substances, in combination, a hermetically closable drum for receiving the substances to be treated, having a central opening, a horizontal axle to which said drum is fixed, a frame part in which said horizontal axle is turnably mounted, means to mount said frame part and thereby the drum tiltable in a plane at right angles to the axis of said drum, a mixing and kneading implement, an axle to which said implement is fixed, said axle being rotatably mounted in said frame at an inclination of 45° in the downward direction and passing through said central opening in the drum, and means to close said opening air-tight.

10. A mixing and kneading machine, particularly for treating doughy substances, in combination, a hermetically closable drum for receiving the substances to be treated, having a central opening, a horizontal axle to which said drum is fixed, a stirrup-shaped frame enclosing the drum from one side, columns on which said frame is supported, a mixing and kneading blade, an axle on which said blade is fixed, said axle being rotatably mounted in said frame at an inclination of 45° in the downward direction and passing through said central opening in said drum, means for rotating said drum, and means for rotating said blade.

11. A mixing and kneading machine, particularly for treating doughy substances, in combination, a hermetically closable drum for receiving the substances to be treated having a central opening, a horizontal axle to which said drum is fixed, a stirrup-shaped frame enclosing the drum from one side, columns on which said frame is supported, a mixing and kneading blade, an axle on which said blade is fixed, said axle being rotatably mounted in said frame at an inclination of 45° in the downward direction and passing through said central opening in said drum, an electric motor mounted on one of the shanks of said frame, transmission means interposed between said motor and said drum for rotating the latter, a further electric motor mounted in the other of the shanks of said frame, and transmission means interposed between said further motor for rotating said blade independent of the drum.

12. A mixing and kneading machine comprising in combination, a hermetically sealed receptacle for the material rotatable on a horizontal axis, an axle inclined at 45° downwardly through a central opening in the side of the receptacle, a mixing and kneading implement on said axle, and an axle having a bore therethrough extending into the opposite side of the receptacle at its centre.

In testimony whereof I have signed my name to this specification.

FRIEDRICH AESCHBACH.